Aug. 22, 1933.    I. ROSENBAUM    1,924,001
SPECTACLE TEMPLE FASTENING DEVICE
Filed May 12, 1932
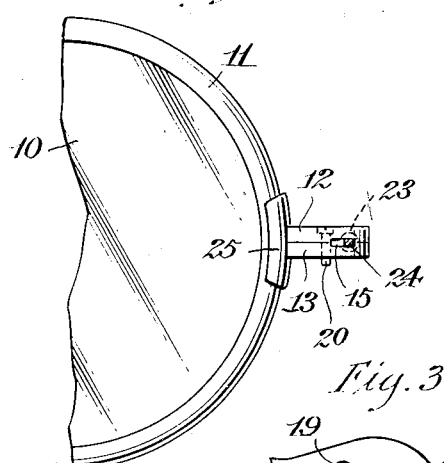
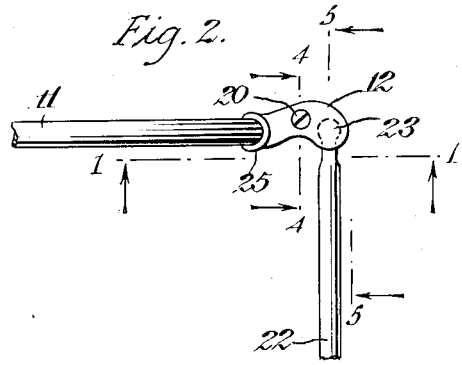
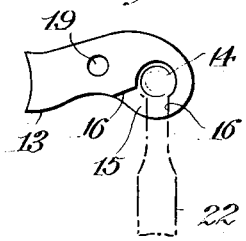
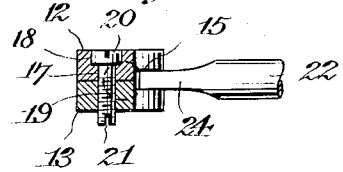
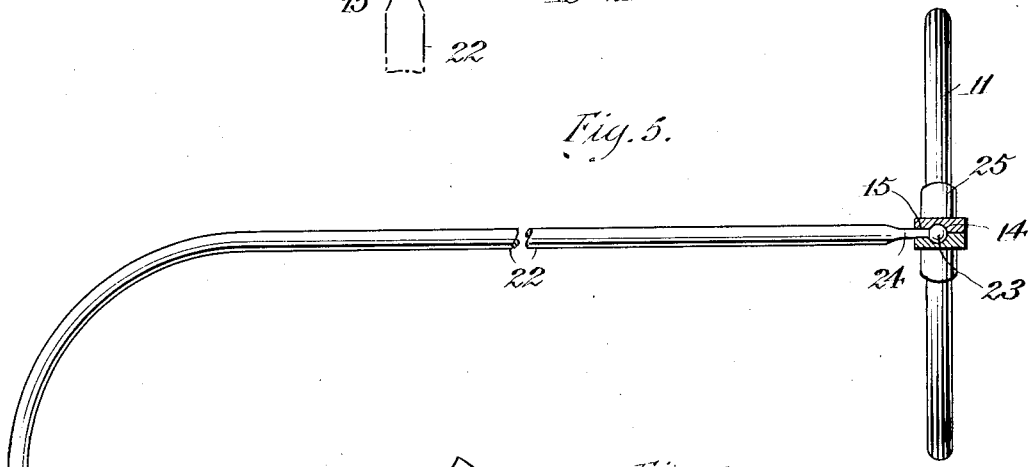
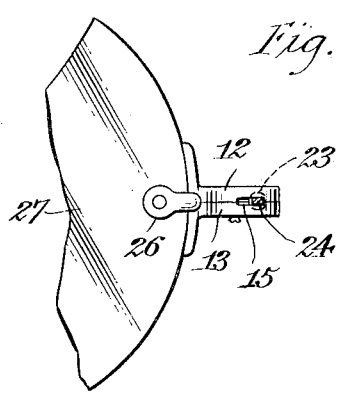
WITNESSES
INVENTOR
Ike Rosenbaum
BY
ATTORNEYS Patented Aug. 22, 1933

1,924,001

UNITED STATES PATENT OFFICE 1,924,001

SPECTACLE TEMPLE FASTENING DEVICE

Ike Rosenbaum, Mount Vernon, Ind.

Application May 12, 1932. Serial No. 610,909

2 Claims. (Cl. 88—53)

This invention relates to a temple fastening device applicable to ophthalmic mountings, eye glasses and spectacles.

The principal object of the invention is the provision of a fastening device of the indicated character whose parts are of efficient and substantial design for effectually fastening or attaching the temples to the lenses of ophthalmic mountings, with or without rims, and which make it possible to use one type of temple and one type of stud for either the right or left side of the ophthalmic mountings.

With the foregoing and other objects in view, the invention resides in the particular provision, constructions and combinations of parts hereinafter fully described and illustrated in the accompanying drawing, in which Figure 1 is a sectional view taken on the line 1—1 of Figure 2, showing a portion of a lens having a rim, and a temple attached to the rim in accordance with the invention;

Figure 2 is a top view of the parts shown in Figure 1;

Figure 3 is a view of one of the parts of the stud.

Figure 4 is an enlarged section taken on the line 4—4 of Figure 2;

Figure 5 is a section taken on the line 5—5 of Figure 2;

Figure 6 is a view similar to Figure 1 showing the temple attached to a rimless lens, a portion of the latter being shown.

The present invention essentially involves the lenses of eye glasses or spectacles with rims or without rims. In Figures 1, 2 and 5 there is shown a lens 10 having a rim 11. In accordance with the invention use is made of a temple stud consisting of two parts or end pieces 12 and 13 which are of substantially similar construction and of similar shape. It is to be understood that the parts 12 and 13 may be of any other shape than that shown in the present instance. The parts 12 and 13 are so constructed that when laid together and fastened to each other they form a cavity 14 and communicating slot 15, and shoulders 16, respectively, at the ends of the slot 15. It is obvious that similar recesses will be formed in each of the parts 12 and 13, as shown most clearly in Figure 3, to form the cavity 14, slot 15 and shoulders 16. The designations 14, 15 and 16 are applied with singularity to one or both of the parts 12 or 13. The part 12 has a hole 17 therein having a countersink 18. The part 13 has a tapped hole 19 which may be brought into registration with the hole 17 when the parts 12 and 13 are brought together. The holes 17 and 19 accommodate a screw 20 which is threaded in the hole 19 and the head of the screw is countersunk in the countersink 18. The threaded end of the screw 20 has a slot 21 which enables the screw to be spread somewhat to prevent the screw from coming out. In this manner the parts 12 and 13 are securely fastened together. Use is made of a temple 22 having terminal means adapted to be received by the stud consisting of the parts 12 and 13 constructed as described hereinabove. The said terminal means consists of a ball 23 on the inner end of the temple 22, and said end being preferably reduced and non-circular in cross section adjacent the ball 23 by flattening the same, as at 24, to prevent the temple from turning on its own longitudinal axis.

In assembling the parts, the parts 12 and 13 are laid together in relation to the temple 22 so that the end 24 will extend through the slot 15 with the ball 23 disposed in the cavity 14. The screw 20 is then projected into the hole 17 and is threaded in the hole 19. In this manner the temple will be securely fastened to the stud constituted of the parts 12 and 13, and the said temple will have pivotal movement limited by means on the stud consisting of the shoulders 16. The stud may be provided with a base 25 suitable for attaching the stud to the rim 11 of the lens 10 with the stud projecting laterally therefrom, as shown in Figures 1, 2 and 5. As shown in Figure 6, the stud may be provided with a base 26 suitable for attaching the stud to a rimless lens 27.

From the foregoing it will be apparent that there has been described a temple fastening device whose parts are of efficient and substantial design whereby the objects of the invention hereinbefore specified may be attained.

I claim:

1. In a device of the class described, the combination with a lens, of a pair of cooperative end pieces secured to and projecting laterally from the lens, a temple, said end pieces being so constructed as to form a cavity and communicating slot, and shoulders respectively at the ends of the slot, said temple having a reduced non-circular portion extending through said slot and having a ball on its inner end disposed in said cavity, and means securing said end pieces together, the provision and arrangement being such that said temple cannot turn on its own axis and is secured to said lens for pivotal movement in relation thereto limited by said shoulders.

2. In a device of the class described, the combination with a lens, of a pair of co-operative end pieces secured to and projecting laterally from the lens, a temple, said end pieces being so constructed as to form a cavity and a communicating transverse slot, and shoulders respectively at the ends of the slot, means securing said end pieces together, said temple having a ball on its inner end disposed in said cavity and said temple also having a flattened portion adjoining the ball disposed in said slot, the provision and arrangement being such that said temple is secured to said lens for lateral pivotal movement only which is limited by the flattened portion engaging said shoulders.

IKE ROSENBAUM.